June 1, 1965 F. G. HILL 3,186,337

TAPE CODING ATTACHMENT

Filed Jan. 2, 1962 4 Sheets-Sheet 1

INVENTOR
FORREST G. HILL
BY Kingsland, Rogers, Ezell & Robbins
ATTORNEYS

June 1, 1965 F. G. HILL 3,186,337

TAPE CODING ATTACHMENT

Filed Jan. 2, 1962 4 Sheets-Sheet 2

INVENTOR
FORREST G. HILL
BY
Kingsland, Rogers, Ezell & Robbins
ATTORNEYS

June 1, 1965 F. G. HILL 3,186,337

TAPE CODING ATTACHMENT

Filed Jan. 2, 1962 4 Sheets-Sheet 3

INVENTOR
FORREST G. HILL
BY
Kingsland, Rogers, Ezell & Robbins
ATTORNEYS

June 1, 1965 F. G. HILL 3,186,337

TAPE CODING ATTACHMENT

Filed Jan. 2, 1962 4 Sheets-Sheet 4

INVENTOR
FORREST G. HILL
BY
Kingsland, Rogers, Ezell & Robbins
ATTORNEYS

United States Patent Office 3,186,337
Patented June 1, 1965

3,186,337

TAPE CODING ATTACHMENT

Forrest G. Hill, East St. Louis, Ill., assignor to Marsh Stencil Machine Company, Belleville, Ill., a corporation of Illinois Filed Jan. 2, 1962, Ser. No. 163,837
2 Claims. (Cl. 101—228)

This invention relates to a tape coder for printing code designations upon tape stock traveling at high speed through the tape coder.

In brief, the tape coder comprises a frame which supports various operating parts, the main functions of which are to feed and guide tape through the coder. These operating parts include a pair of space side guide plates and front and back guide plates between which the tape is fed and a guide roller against which the tape presses and which rotates as the tape passes through the machine. The adjustable guide plates and the guide roller are positioned toward the tape entrance side of the frame. The frame also supports a polished platen roller that provides a rotating backing surface for the tape during a printing operation. At the tape exit end of the frame, there is another roller that not only guides the tape as it leaves the tape coder, but also keeps the tape flat as it passes across the platen roller.

The side guide plates, that are movable toward and away from one another, provide an adjustment for different widths of tapes passing through the coder. Once these guide plates are set for a specific tape, no further adjustment has to be made, and the tape is automatically fed straight through the machine. These guide plates, together with the tape exit roller and the front and back guide plates, eliminate misalignment of the tapes that otherwise causes the tape to buckle and tear.

A roller frame casting is pivotally supported by the frame and itself supports a die roller assembly, a transfer roller assembly, and an ink applying assembly. The die roller assembly carries a rubber printing plate and the transfer roller receives ink from the ink applying assembly and spreads it evenly upon the printing surfaces of the printing plate as the die roller assembly rotates. The roller frame casting is spring biased in a direction to urge the die wheel assembly toward the platen roller. However, there is a lever that permits locking of the roller frame casting with the die wheel assembly moved away from the platen roller.

The ink applying assembly comprises an ink reservoir with a felt ink pad partially submerged within the reservoir and projecting above the reservoir at its other end. The upper end of the ink pad makes continual contact with the transfer roller under the biasing of a light torsion spring. The ink pad is kept saturated with ink by the capillary action of the felt and continuously spreads a uniform film of ink onto the surface of the transfer roller.

An object of this invention is to provide a tape coder having means for feeding and guiding tape through the coder at high speed and means for printing unblurred code indications upon the tape as it travels through the coder.

Another object of the invention is to provide a tape coder having adjustable side guide plates movable toward and away from one another according to the width of tape being fed through the machine and having tape exit guide means. The side guide plates straddle the tape with little clearance as the tape enters the machine. The front and back guide plates keep the tape flat through the coder. The tape coder also has a roller at the tape exit with the tape making part of a turn about the exit roller to further guide the tape through the coder.

Another object of the invention is to provide a tape coder having means for continuously applying a film of ink onto a transfer roller which, in turn, applies ink uniformly to the printing surfaces of a rubber printing plate as it rotates past the transfer roller. A further object is to provide means for adjusting the contact pressure between the transfer roller and the printing surfaces.

Another object of the invention is to provide a tape coding machine having means to feed and guide tape therethrough with a platen roller across which the tape passes and a die wheel opposite the platen roller and movable toward the platen roller, the die wheel having a rubber printing plate carried upon its outer surface for rotation past the platen roller to print coding upon tape passing between the platen roller and the die wheel, the die wheel having hard rubber rings or wheels on opposite sides of the printing plate which engage the platen roller to provide an anti-skid drive between the platen roller and the die wheel.

Another object of the invention is to provide a tape coder having a die wheel carrying a rubber printing plate and a platen roller opposite the die wheel for guiding tape past the die wheel with means for applying ink to the printing surfaces of the printing plate, the ink supplying means being free of control valves, metered orifices, and adjustment requirements.

Another object of the invention is to provide a tape coder having a rotary printing plate with a transfer roller for receiving inks from a felt pad and applying the ink to the printing surfaces of the rotary printing plate, the transfer roller being made of a phenolic substance to provide less friction with the felt, thereby producing a longer felt life, and also providing good inking characteristics.

Another object of the invention is to provide a tape coder having a die wheel comprising a plurality of thermo plastic discs mounted side-by-side, the discs having high radial stability, but being longitudinally flexible to allow ready insertion of a plurality of projecting grooves of a rubber printing plate and to thereafter supply a rigid radial support for the printing plate, thereby providing fast and accurate rubber type mounting.

Another object is to provide a tape coder having a die wheel assembly that is light in weight and that has high durometer rubber wheels for engaging a platen roller across which tape moves and against which a printing operation is performed during rotation of the die wheel assembly. The high durometer tires provide virtually no skid between the platen roller and the die wheel assembly, and the light weight of the die wheel assembly provides low inertia forces of the die wheel assembly to reduce skidding during a printing operation.

Another object is to provide means to apply a high pressure between the die wheel assembly and the platen roller to yield a more positive drive between the fast moving tape and the printing surfaces of the die wheel.

Other objects and advantages will be apparent to those skilled in the art.

Figures 7, 8:
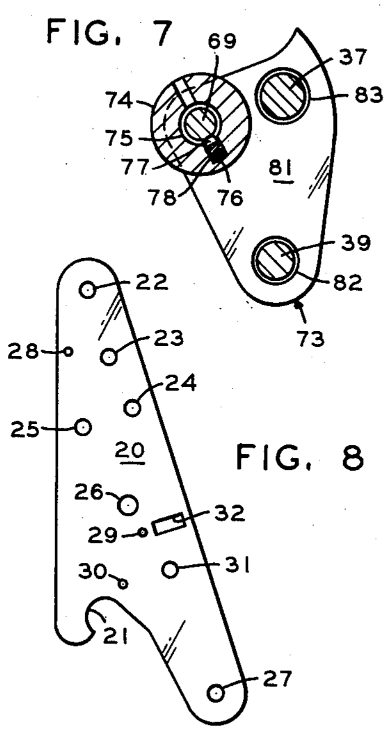
FIGURE 7 is a view in section taken along the line 7—7 of FIGURE 5.
FIGURE 8 is a side elevation view on a reduced scale of a side plate.
Figure 9:
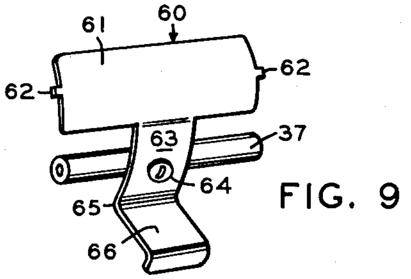
FIGURE 9 is a perspective view of the front guide plate.

The tape coder has two sides or mounting plates 20, shown alone in FIGURE 8, between which all of the operating parts and assemblies are mounted. The side plates 20 have the irregular shape shown in FIGURE 8, including the hook 21 which cooperates with other parts to facilitate mounting of the tape coder on specific tape machines, but otherwise the shape of the plates 20 is not essential to the operation of the tape coder. Each side plate 20 has holes 22, 23, 24, 25, 26 and 27 through it, four smaller holes 28, 29, 30 and 31, and a rectangular slot 32. Various parts are mounted within these holes as will be described.

A pair of roller assemblies 33 are mounted within the rectangular slots 32. These roller assemblies 33 are a part of the mounting mechanism of the tape coder and do not offset the operation of it.

A tie rod 34 is connected between the lower ends of the plates 20. The tie rod 34 is fastened to the plates by Allen head screws 35 which are passed through the holes 27 in the side plates 20. The tie rod 34 has three transverse or diametric bores 36 for a purpose to appear.

Another tie rod 37 is connected between the plates 20 by Allen head screws 38 which are connected through the holes 24 in the side plates 20.

Figure 6:
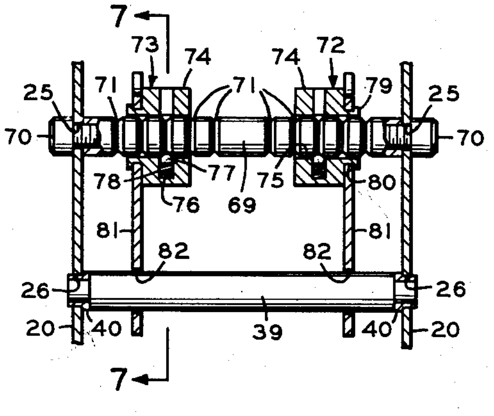
FIGURE 6 is a view in section taken along the line 6—6 of FIGURE 2.
Figure 10:
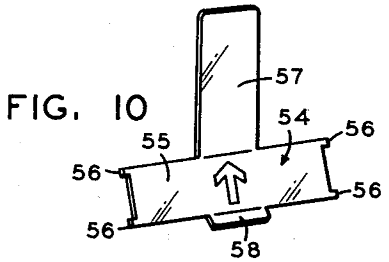
FIGURE 10 is a perspective view of the back guide plate.

A guide roller 39, shown particularly in FIGURE 6, is mounted between the side plates 20. The guide roller 39 is rotatably journaled within a pair of bushings 40 that are fitted within the holes 26 in the side plates 20.

A roller shaft 43 is connected between the plates 20 by Allen head screws 44 and 45 which extend through the holes 23 in the side plates 20. The screw 45 also serves another connecting purpose which will be described. A polished platen roller 46 is rotatable about the shafts 43 upon ball bearings 47.

Another roller shaft 48 is mounted between the upper ends of the plates 20. The shaft 48 is fastened by Allen head screws 49 that extend through the holes 22 in the side plates 20. A polished tape exit roller 50 is rotatable about the shaft 48 upon ball bearings 51.

A back guide plate 54 is mounted between the side plates 20 in a position slightly forward of the guide roller 39. The guide plate 54 has a wide plate portion 55 at its lower end with tabs 56 that fit within the holes 29 and 30 in the side plates 20. A narrower strip 57 extends upwardly from the wide plate portion 55 past the guide roller 39 and beyond the tie rod 37 to the forward side thereof. A short flange 58 extends below the wide plate portion 55.

Figure 4:
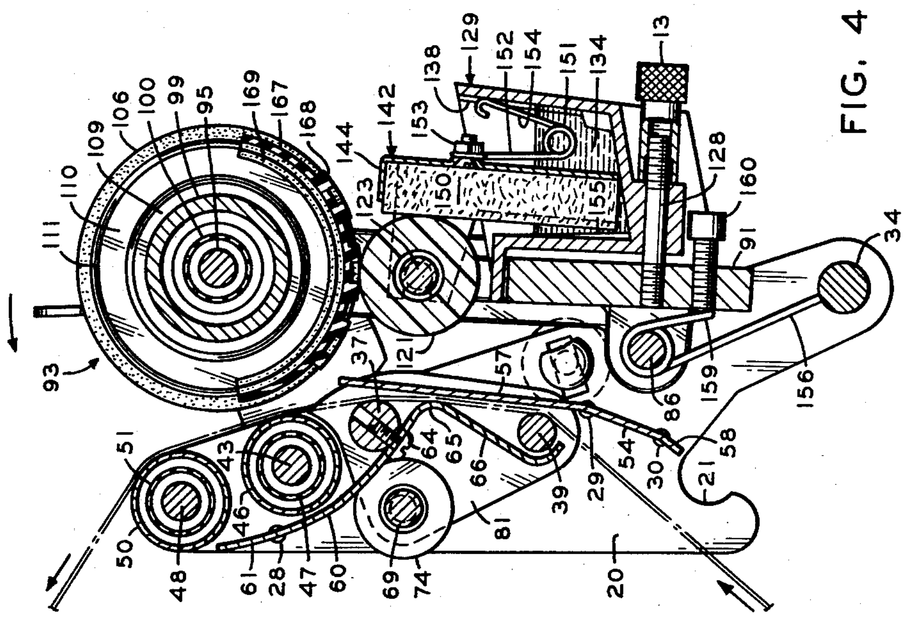
FIGURE 4 is a side elevation view in section taken along the line 4—4 of FIGURE 3.
Figure 3:
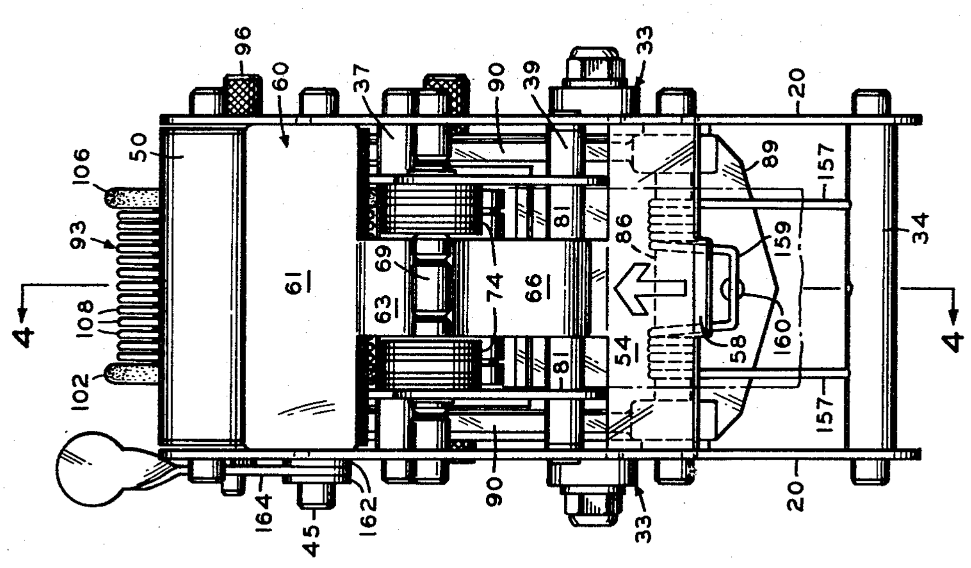
FIGURE 3 is a rear elevation view of the tape coder.

A front guide plate 60 has a wide plate portion 61 with end tabs 62 that fit within the holes 28 in the side plates 21. The wide plate portion 61 is positioned rearward of the platen roller 46 and is curved downwardly and forwardly, as shown in FIGURE 4. A thin strip 63 extends below the wide plate portion 61. The thin strip 63 continues the forward curvature of the wider plate portion 61 and extends below and slightly forward of the tie rod 37. The thin strip 63 is fastened by a screw 64 to the tie rod 37. There is a fairly sharp bend 65 in the strip 63 which is spaced slightly from the strip 57 of the back guide plate 54. Then the thin strip 63 has a portion 66 that extends downwardly and rearwardly past the front side of the guide roller 39.

A guide pin 69 is fastened between the side plates 20 by Allen head screws 70 which fit within the holes 25 in the side plates 20. The guide pin 69 has a plurality of peripheral grooves 71 on opposite sides of its center. The guide pin 69 supports a pair of left and right guide assemblies 72 and 73. These are shown particularly in FIGURES 6 and 7. Each guide assembly comprises a cylindrical block 74 having a passage 75 through it that allows the block to be slid along the guide pin 69. There is a recess 76 within each cylindrical block 74 and a ball 77 within each recess is urged by a spring 78 into one of the peripheral grooves 71 to releasably lock the cylindrical blocks 74 in any one of several selected positions along the guide pin 69.

The outer end of each cylindrical block 74 has a hub 79 on it with a peripheral groove 80 for receiving a guide plate 81. Each guide plate 81 has a hole 82 through its lower end which loosely receives the guide roller 39. At its upper end, each guide plate 81 has another hole 83 through it for loosely receiving the tie rod 37. Hence, the guide plates 81 are slidable with the cylindrical blocks 74, not only along the guide pin 69, but also along the guide roller 39 and along the tie rod 37. The space between the guide plates 81 can thus be adjusted according to the width of tape being fed through the machine.

A roller frame casting shaft 86 is mounted between the side plates 20 by Allen head screws 87 to extend through the holes 31 in the side plates 20. The shaft 86 supports a roller frame casting 89, shown particularly in FIGURE 11. The roller frame casting 89 has a pair of side arms 90 held together by a crossplate 91 that extends across the lower portions of the side arms. The side arms 90 have holes 92 through their lower ends which loosely receive the shaft 86. Hence, the casting 89 is pivotal about the shaft 86.

Figure 11:
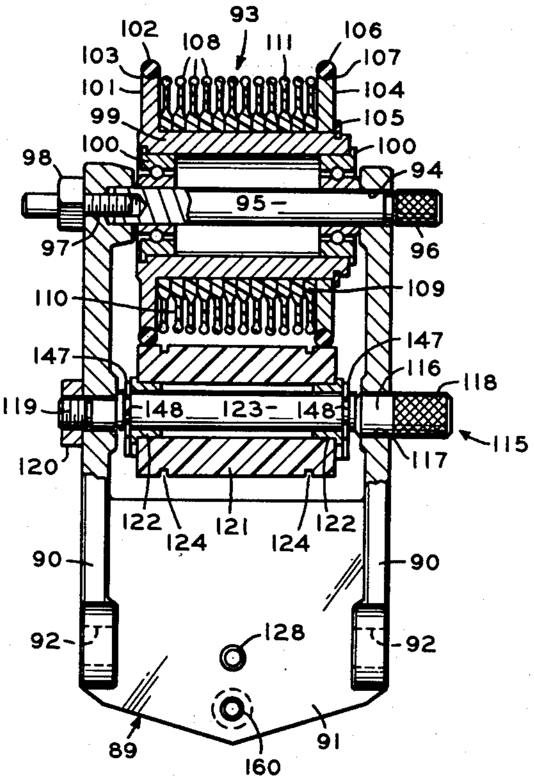
FIGURE 11 is a front elevation view partly in section of the roller frame casting, the die wheel assembly, and the transfer roller assembly.
Figure 12:
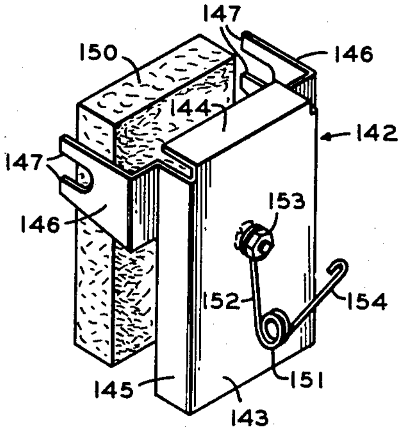
FIGURE 12 is an isometric view of the ink pad and ink pad holder.

A die wheel assembly 93 is supported between the upper ends of the arms 90. For this support, there is a hole 94 through the upper end of the one of the arms 90 for receiving a roller shaft 95. An end 96 of the shaft 95 extends beyond the arm 90 and is knurled, as shown in FIGURE 11. The upper end of the other arm 90 has a smaller hole 97 through it for receiving a threaded lockout stud 98 which is threaded into the end of the roller shaft 95.

The die wheel assembly 93 includes a roller hub 99 which is journaled upon ball bearings 100 and is rotatable about the roller shaft 95. Integral with one end of the roller hub 99 is a radial wheel 101 having a high durometer (50 or more) rubber ring 102 sprung into a groove 103 about its outer perimeter. Another radial wheel 104 is removable from the hub 99, but is held in place by a lock ring 105. The wheel 104 also has a high durometer rubber ring 106 sprung into a groove 107 about its periphery. A plurality of thermoplastic discs 108 are tightly mounted upon the hub 99 between the wheels 101 and 104. Each disc 108 has a thick base 109 near the hub 99 with a thinner web 110 extending radially outwardly from the base 109. Each disc 108 also has a peripheral bead 111 surrounding the web 110. The discs 108 are pressed tightly together at their bases but the beads 111 are small enough in diameter so that there is a space between them. The thin webs 110 allow for some lateral movement of the beaded edges 111, but the discs 108 are stiff or rigid in a radial direction.

An ink transfer assembly 115 is mounted between the casting arms 90 below the die wheel assembly. The assembly 115 includes a transfer roller shaft 116 that extends through holes 117 in the arms 90. An end 118 of the shaft extends beyond one of the arms 90 and is knurled as is shown in FIGURE 11. The other end 119 of the shaft 116 is threaded and is locked in place by a lock nut 120. A phenolic transfer roller 121 is mounted upon a pair of brass bushings 122 that are rotatably journaled upon the shaft 116. As can be seen in FIGURE 11, the bushings 122 are mounted upon a central portion 123 of the shaft 116, and the axis of the central portion 123 is eccentric to the axes of the ends 118 and 119 of the shaft. Hence, rotation of the shaft 116 (by rotating the knurled end 118) moves the transfer roller 121 toward or away from the die wheel assembly, thus allowing adjustment of the pressure between the transfer roller 121 and the rubber rings 106. The transfer roller has grooves 124 that tend to keep ink from flowing to the outer edges which contact the rubber rings 106.

Figure 13:
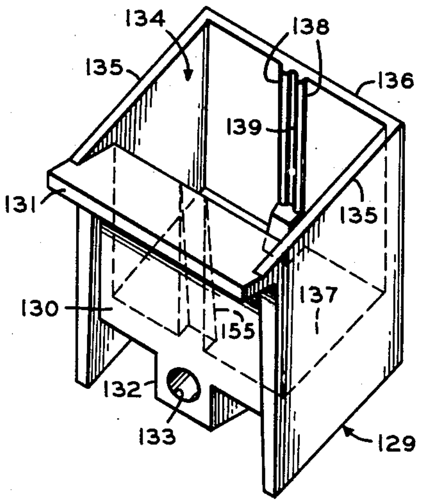
FIGURE 13 is an isometric view of the ink reservoir casting.

A stud 128 is threaded to the casting 89 and extends forwardly thereof between the lower ends of the arms 90. A reservoir casting 129, shown in FIGURE 13, has a rear wall 130 with an upper flange 131 that rests upon the upper side of the connecting plate 91 of the roller frame casting. The wall 130 also has a lower boss 132 with a hole 133 through it for receiving the stud 128. The reservoir casting 129 is held in place by threading a knurled reservoir nut 13 onto the stud 128. The upper flange 131 keeps the reservoir 129 aligned between the arms 90. The reservoir 129 has an ink well 134 defined by the already mentioned rear wall 130, and by side walls 135, a front wall 136, and a bottom wall 137. There are a pair of beads 138 in the center of the front wall 136 that define a vertical groove 139 between them.

An ink pad holder 142 fits within the ink reservoir casting, as shown in FIGURE 4. The ink pad holder 142 has a back 143, a top flange 144 and side flanges 145. A pair of arms 146 extend rearwardly of the side flanges 145 and each has a bifurcated end 147 that straddles the transfer roller shaft 116 within a groove 148 thereon (see FIGURE 11). A felt ink pad 150 fits within the ink pad holder 142, between the side flanges 145 and below the top flange 144. The pad 150 is biased against the transfer roller 121 by a light torsion spring 151 which has an arm 152 that is fastened to the front plate 143 by a screw and nut combination 153, the screw being countersunk into the front plate 143 as shown in FIGURE 4. The other arm 154 of the torsion spring 151 is seated within the vertical groove 139 in the front wall 136 of the reservoir casting 129. Because the torsion spring 151 is positioned at the center of the ink pad holder 142 and at the center of the front wall 136 of the reservoir casting 129, it causes the felt pad 150 to exert a uniform pressure against the transfer roller 121. The bottom of the felt pad 150 rests and is free to pivot about a rib 155 on the rear wall 130. This aids in uniform pressure distribution against the transfer roller 121.

Although the roller frame casting 89 is pivotal about the roller frame casting shaft 86, it is biased toward the side plates 20 and the operating parts between them by a fairly strong torsion spring 156. The torsion spring 156 has a pair of arms 157 that extend within the transverse bores 36 in the tie rod 34. It then has coils 158 that are wound about the roller frame casting shaft 86 with a loop 159 that extends below the shaft 86 diametrically opposite the spring arms 157. The crossplate 91 of the roller frame casting 89 has a setscrew 160 threaded into it. The loop 159 bears against the end of this setscrew 160 as shown in FIGURE 4, and the setscrew 160 can be used to adjust the pressure of the spring 156.

Figure 2:
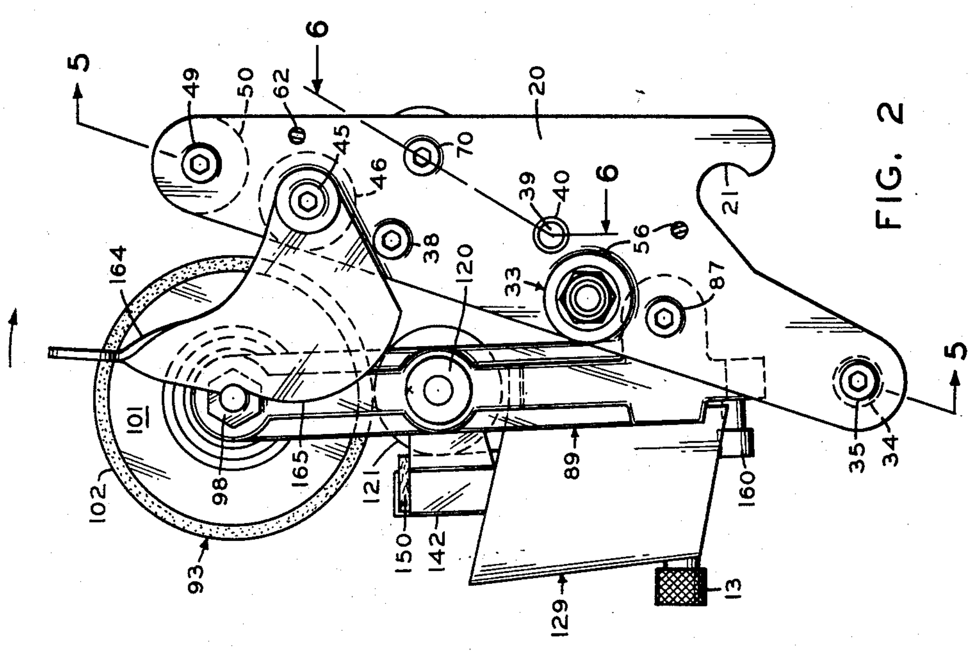
FIGURE 2 is a side elevation view of the tape coder.
Figure 1:
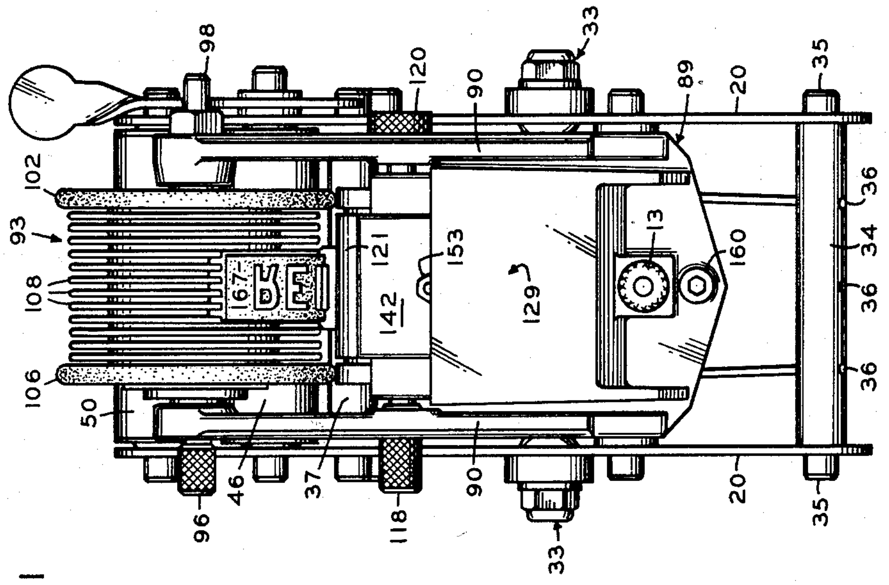
FIGURE 1 is a front elevation view of the tape coder.
Figure 5:
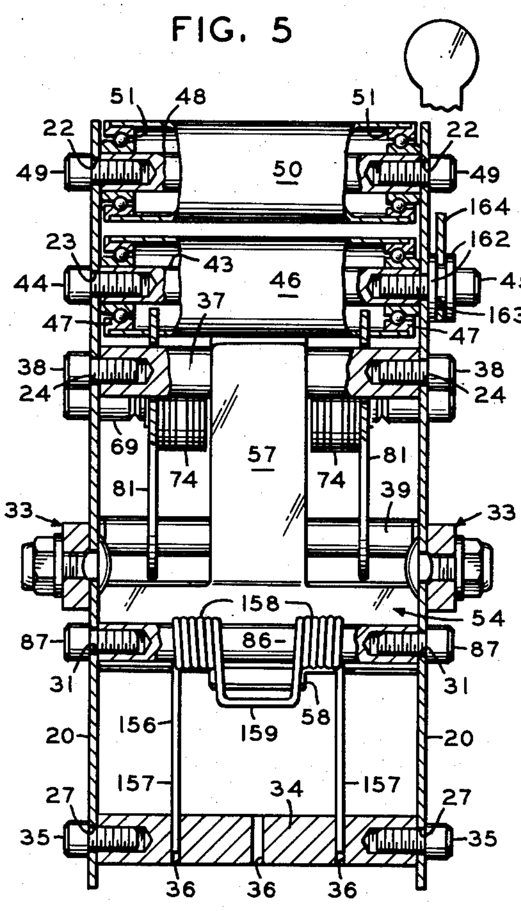
FIGURE 5 is a view in section taken along the line 5—5 of FIGURE 2.

As shown in FIGURE 5, the Allen head screw 45 that connects one side of the platen roller shaft 43 to a side plate 20 also supports a pair of washers 162 spaced apart by a smaller bushing 163. A lever 164 is mounted upon the bushing 163 and is rotatable about the bushing. As shown in FIGURE 2 the lever 164 has a forward cam surface 165 that bears against the projecting end of the lockout stud 98 that supports one side of the die wheel shaft 95. When the lever 164 is moved to the position illustrated in FIGURE 2, it pivots the roller frame casting 89 against the force of the torsion spring 156, moving the die wheel assembly 93 away from the platen roller 46. When the lever 164 is pivoted in a clockwise direction as viewed in FIGURE 2, it releases the roller frame casting 89, and the torsion spring 156 biases the die wheel assembly 93 toward the platen roller 46.

Figure 14:
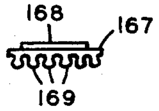
FIGURE 14 is an end elevation view on a slightly enlarged scale of a printing plate.

An example of a rubber inking plate 167 is shown in FIGURE 14. The plate 167 has raised printing characters 168 on its outer surface and a plurality of parallel beaded tongues 169 projecting from its lower surface. The tongues 169 snap into the space between, radially inward of the beads 111 of the thermoplastic discs on the die wheel assembly 93.

*Operation*

Before the tap coder is used, the left and right tape guide assemblies 72 and 73 are adjusted along the guide pin 69 until the side guide plates 81 are spaced apart by the proper distance according to the width of tape being fed through the coder. The spring loaded balls 77 on the cylindrical block 74 lock the tape guide assemblies 72 and 73 in any one of several selected positions according to the positions of the grooves 71 on the guide pin 69. When the reservoir 129 is filled with ink, and when the lever 164 releases the roller frame casting 89 so that the hard rubber wheels 106 on the die wheel assembly 93 bear against the platen roller 46, the tape coder is ready for use.

As illustrated in FIGURE 4, tape is fed into the coder between the side plates 20 and between the back guide plate 54 and the front guide plate 60. The tape travels past the guide roller 39 where its direction is changed somewhat and moves through the space between the bent part 65 on the front guide plate 60 and the opposing strip 57 on the back guide plate 54. Then the tape travels past the tie rod 37, past the platen roller 46, and is then turned somewhat around the exit roller 50 as it leaves the tape coder. The guide roller 39, the platen roller 46 and the exit roller 50 are all freely rotatable about their respective shafts and therefore rotate according to the speed of the tape as it passes through the tape coder. The latter two rollers 46 and 50 are journaled upon ball bearings 47 and 51 to reduce friction.

As the tape rotates past the platen roller 46, it rotates the platen roller. When the platen roller rotates, its friction engagement with the hard rubber wheels 106 on the die roller assembly 93 causes the die roller to rotate. As the die roller rotates, its rubber wheels 106, which bear against the transfer roller 121, cause the transfer roller to rotate across the felt ink pad 150. The ink pad 150 remains saturated with ink due to its capillary action and applies a uniform, thin film of ink onto the transfer roller 121, which, in turn, applies a film of ink to the raised characters 168 of the rubber printing plate 167. After picking up ink from the transfer roller 121, the printing plate 167 rotates with the die wheel assembly 93 in a clockwise direction as shown in FIGURE 4, and the printing characters 168, which extend beyond the rubber wheels 106, make their print upon the moving tape.

The density of the ink applied to the printing surfaces of the printing characters 168 on the printing plate 167 can be regulated by adjusting the pressure applied by the transfer roller 121 to the printing plate. The transfer roller 121 can be adjusted in its position by rotation of the knurled end 118 of the shaft 116. Because of the eccentric nature of the central portion of the shaft 116, this rotation moves the transfer roller 121 toward or away from the die roller assembly 93.

The pressure that the die wheel assembly 93 applies against the platen roller 46 can also be adjusted. Adjustment of the setscrew 160 against the loop 159 of the coil spring 156 regulates the biasing force of the coil spring. It is usually preferable to maintain a relatively high pressure of this spring so that skidding between the platen roller 46 and the die wheel assembly 93 is eliminated.

It is easy to remove the ink reservoir casting 129 and the ink pad 150 from the roller frame casting 89. Removal of the thumbscrew 134 releases the ink reservoir casting 129, and it can be drawn away from the casting 89. As it is removed, the bifurcated ends 147 on the side arms 146 of the ink pad holder are withdrawn from the shaft 121. Thereafter, the ink pad holder 142 can be lifted out of the reservoir and both parts can be readily cleaned.

The printing plate 167 is fastened to the die wheel assembly 93 by pressing its tongue projections 169 into the spaces between the thermoplastic discs 108. These discs yield longitudinally to admit the projections 169. After the plate 167 is in place, it is held rigidly in a radial direction because the thermoplastic discs are radially stiff.

Various changes and modifications may be made within the process of this invention as will be readily apparent to those skilled in the art. Such changes and modifications are within the scope and teaching of this invention as defined by the claims appended hereto.

What is claimed is:

1. A tape coder comprising a frame including spaced side members, a back guide plate supported between the side members, a front guide plate supported between the side members, the front guide plate being spaced from the back guide plate, a guide roller spaced from the back guide plate for directing tape through the tape coder, the guide roller being positioned adjacent the tape entry side of the frame, a platen roller rotatably supported between the side plates and positioned toward the tape exit side of the frame, a tape exit roller positioned adjacent the tape exit side of the frame and rotatably supported by the side plates, a tape guide rod, a pair of longitudinal tape guide plates supported by the tape guide rod, means for adjusting the positions of the longitudinal tape guide plates to accommodate various widths of tape, the longitudinal tape guide plates being positioned adjacent the tape entrance side of the frame, and means for intermittently printing code designations upon the tape as it passes the platen roller.

2. A tape coder comprising a frame including spaced side members, a back guide plate supported between the side members, a front guide plate supported between the side members, the front guide plate being spaced from the back guide plate, a guide roller spaced from the back guide plate for directing tape through the tape coder, the guide roller being positioned adjacent the tape entry side of the frame, a platen roller rotatably supported between the side plates and positioned toward the tape exit side of the frame, a tape exit roller positioned adjacent the tape exit side of the frame and rotatably supported by the side plates, a tape guide rod, a pair of longitudinal tape guide plates supported by the tape guide rod, the longitudinal tape guide plates being positioned adjacent the tape entrance side of the frame, and means for intermittently printing code designations upon the tape as it passes the platen roller.

References Cited by the Examiner

UNITED STATES PATENTS

| | | | |
|---|---|---|---|
| 812,255 | 2/06 | Bjurstrum | 101—350 |
| 835,903 | 11/06 | Grant | 101—227 |
| 1,670,062 | 5/28 | Carroll | 101—228 X |
| 1,814,886 | 7/31 | Baeck | 101—350 |
| 1,957,291 | 5/34 | Rees | 101—228 |
| 2,297,525 | 9/42 | Anheuser | 242—76 |
| 2,448,659 | 9/48 | Champion | 242—76 |
| 2,643,609 | 6/53 | Gottscho | 101—377 |
| 2,746,389 | 5/56 | Alessi et al. | 101—377 |
| 2,791,175 | 5/57 | Sohn | 101—128 |
| 2,874,637 | 2/59 | Grevich | 101—377 |

ROBERT E. PULFREY, *Primary Examiner.*

ROBERT A. LEIGHEY, EUGENE R. CAPOZIO, *Examiners.*